(12) United States Patent
Brownlee

(10) Patent No.: US 6,188,781 B1
(45) Date of Patent: *Feb. 13, 2001

(54) METHOD AND APPARATUS FOR ILLUMINATING A FINGERPRINT THROUGH SIDE ILLUMINATION OF A PLATEN

(75) Inventor: Kenneth Brownlee, Palo Alto, CA (US)

(73) Assignee: Digital Persona, Inc., Redwood City, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/124,182

(22) Filed: Jul. 28, 1998

(51) Int. Cl.$^7$ ..................................................... G06K 9/00
(52) U.S. Cl. .......................................... 382/127; 382/124
(58) Field of Search .................. 382/115–116, 124–127; 356/71

(56) References Cited

U.S. PATENT DOCUMENTS

| | | |
|---|---|---|
| 3,419,287 | 12/1968 | Rudie . |
| 3,423,886 | 1/1969 | Schpak et al. . |
| 3,482,498 | 12/1969 | Becker . |
| 3,527,535 * | 9/1970 | Monroe ................................ 382/124 |
| 3,872,438 | 3/1975 | Cuttill et al. . |
| 3,959,884 | 6/1976 | Jordan et al. . |
| 3,975,711 | 8/1976 | McMahon . |
| 4,047,154 | 9/1977 | Vitols et al. . |
| 4,151,512 | 4/1979 | Riganati et al. . |
| 4,156,230 | 5/1979 | Riganati et al. . |
| 4,185,270 | 1/1980 | Fischer, II et al. . |
| 4,208,651 | 6/1980 | McMahon . |
| 4,210,899 | 7/1980 | Swonger et al. . |
| 4,225,850 | 9/1980 | Chang et al. . |

(List continued on next page.)

FOREIGN PATENT DOCUMENTS

| | | |
|---|---|---|
| 4125198 | 7/1991 | (DE) . |
| 0159037 | 4/1985 | (EP) . |
| 1283748 | 10/1968 | (GB) . |
| 3-292578 | 12/1991 | (JP) . |
| 5089324 | 8/1993 | (JP) . |
| 1079017 | 9/1996 | (JP) . |
| 8203286 | 3/1982 | (WO) . |
| 9107728 | 11/1990 | (WO) . |

OTHER PUBLICATIONS

Igaki, et al., "Real–Time Fingerprint Sensor Using A Hologram", Applied Optics, vol. 31, No. 11, Apr. 10, 1992, pp. 1794–1802.

"3M™ Image Directing Film (IDF) II Sending Light off in the right direction", 3M "Electronic Display Lighting, literature sales" (1 page).

"3M™ Transmissive Right Angle Film (TRAF) II", All the right angles to do two jobs, 3M "Electronic Display Lightning, literature sales" (1 page).

"3M™ Brightness Enhancement Film (BEF) II", 3M "A brilliant solution for improved backlight efficiency, Electronic Display Lighting, literature sales" (1 page).

"3M™ Brightness Enhancement Film (BEF) II", 3M "Electronic Display Lighting", (4 pages).

*Primary Examiner*—Bhavesh Mehta
(74) *Attorney, Agent, or Firm*—Blakely, Sokoloff, Taylor & Zafman LLP

(57) ABSTRACT

The present invention provides a method and apparatus for illuminating a fingerprint. A finger is placed on a transparent platen which has a microprism array on one surface. A light source directs light through a horizontal plane of the platen to illuminate the finger. Light directed through the platen is substantially parallel to an axis of the microprism array and is largely contained within the body of the platen. The skin in contact with the platen is illuminated by the light, and the light is imaged by an imaging device.

21 Claims, 2 Drawing Sheets

U.S. PATENT DOCUMENTS

| | | |
|---|---|---|
| 4,253,086 | 2/1981 | Szwarcbier . |
| 4,260,979 | 4/1981 | Smith . |
| 4,322,163 | 3/1982 | Schiller . |
| 4,414,684 | 11/1983 | Blonder . |
| 4,449,189 | 5/1984 | Feix et al. . |
| 4,454,610 | 6/1984 | Sziklai . |
| 4,455,083 | 6/1984 | Elmes . |
| 4,525,859 | 7/1985 | Bowles et al. . |
| 4,544,267 | 10/1985 | Schiller . |
| 4,553,837 | 11/1985 | Marcus . |
| 4,581,760 | 4/1986 | Schiller et al. . |
| 4,607,384 | 8/1986 | Brooks . |
| 4,618,988 | 10/1986 | Schiller . |
| 4,636,622 | 1/1987 | Clark . |
| 4,641,350 | 2/1987 | Bunn . |
| 4,646,352 | 2/1987 | Asai et al. . |
| 4,685,145 | 8/1987 | Schiller . |
| 4,696,046 | 9/1987 | Schiller . |
| 4,698,751 | 10/1987 | Parvin . |
| 4,723,298 | 2/1988 | Schiller . |
| 4,728,186 | 3/1988 | Eguchi et al. . |
| 4,747,147 | 5/1988 | Sparrow . |
| 4,752,966 | 6/1988 | Schiller . |
| 4,777,651 | 10/1988 | McCann et al. . |
| 4,784,484 | 11/1988 | Jensen . |
| 4,787,742 | 11/1988 | Schiller et al. . |
| 4,790,564 | 12/1988 | Larcher et al. . |
| 4,805,223 | 2/1989 | Denyer . |
| 4,811,414 | 3/1989 | Fishbine et al. . |
| 4,817,183 | 3/1989 | Sparrow . |
| 4,827,527 | 5/1989 | Morita et al. . |
| 4,837,843 | 6/1989 | Owechko . |
| 4,876,725 | 10/1989 | Tomko . |
| 4,876,726 | 10/1989 | Capello et al. . |
| 4,891,503 | 1/1990 | Jewell . |
| 4,896,363 | 1/1990 | Taylor et al. . |
| 4,906,070 | 3/1990 | Cobb . |
| 4,907,156 | 3/1990 | Doi et al. . |
| 4,933,976 | 6/1990 | Fishbine et al. . |
| 4,944,021 | 7/1990 | Hoshino et al. . |
| 4,947,442 | 8/1990 | Tanaka et al. . |
| 4,947,443 | 8/1990 | Costello . |
| 4,956,870 | 9/1990 | Hara . |
| 4,993,068 | 2/1991 | Piosenka et al. . |
| 4,995,086 | 2/1991 | Lilley et al. . |
| 5,040,223 | 8/1991 | Kamiya et al. . |
| 5,040,224 | 8/1991 | Hara . |
| 5,050,220 | 9/1991 | Marsh et al. . |
| 5,053,608 | 10/1991 | Senanayake . |
| 5,054,090 | 10/1991 | Knight et al. . |
| 5,056,892 | 10/1991 | Cobb . |
| 5,067,162 | 11/1991 | Driscoll, Jr. et al. . |
| 5,095,194 | 3/1992 | Barbanell . |
| 5,101,436 | 3/1992 | DeAguiar et al. . |
| 5,105,467 | 4/1992 | Kim et al. . |
| 5,109,428 | 4/1992 | Igaki et al. . |
| 5,144,680 | 9/1992 | Kobayashi et al. . |
| 5,151,945 | 9/1992 | Lee et al. . |
| 5,175,593 | 12/1992 | Kumagai et al. . |
| 5,187,748 | 2/1993 | Lee . |
| 5,210,797 | 5/1993 | Usui . |
| 5,222,152 | 6/1993 | Fisbhine et al. . |
| 5,222,153 | 6/1993 | Beiswenger . |
| 5,230,025 | 7/1993 | Fishbine et al. . |
| 5,239,590 | 8/1993 | Yamamoto . |
| 5,287,090 | 2/1994 | Grant . |
| 5,402,324 | 3/1995 | Yokoyama et al. . |
| 5,412,463 | 5/1995 | Sibbald . |
| 5,416,573 | 5/1995 | Sartor . |
| 5,448,649 * | 9/1995 | Chen et al. .......................... 382/126 |
| 5,448,659 | 9/1995 | Tsutsui et al. . |
| 5,456,256 | 10/1995 | Schneider et al. . |
| 5,467,403 | 11/1995 | Fishbine et al. . |
| 5,493,621 | 2/1996 | Matsumura . |
| 5,505,222 | 4/1996 | Lee . |
| 5,509,083 | 4/1996 | Abtahi et al. . |
| 5,513,272 | 4/1996 | Bogosian . |
| 5,522,623 | 6/1996 | Soules et al. . |
| 5,524,069 | 6/1996 | Inoue . |
| 5,524,161 | 6/1996 | Omori et al. . |
| 5,530,757 | 6/1996 | Krawczyk . |
| 5,541,994 | 7/1996 | Tomko et al. . |
| 5,563,345 | 10/1996 | Kersten et al. . |
| 5,572,597 | 11/1996 | Chang et al. . |
| 5,596,454 | 1/1997 | Herbert . |
| 5,613,012 | 3/1997 | Hoffman et al. . |
| 5,619,586 | 4/1997 | Sibbald . |
| 5,623,552 | 4/1997 | Lane . |
| 5,625,448 | 4/1997 | Ranalli et al. . |
| 5,644,645 | 7/1997 | Osuga . |
| 5,650,864 | 7/1997 | Tseng et al. . |
| 5,668,603 | 9/1997 | Copeland . |
| 5,680,205 | 10/1997 | Borza . |
| 5,680,460 | 10/1997 | Tomko et al. . |
| 5,712,912 | 1/1998 | Tomko et al. . |
| 5,732,148 * | 3/1998 | Keagy et al. .......................... 382/125 |
| 5,737,420 | 4/1998 | Tomko et al. . |
| 5,740,276 | 4/1998 | Tomko et al. . |
| 5,793,881 | 8/1998 | Stiver et al. . |
| 5,796,858 * | 8/1998 | Zhou et al. .......................... 382/127 |
| 5,817,747 | 10/1998 | Capello et al. . |
| 5,818,956 | 10/1998 | Tuli . |
| 5,822,445 * | 10/1998 | Wong .................................. 382/127 |
| 5,838,306 | 11/1998 | O'Connor et al. . |
| 5,859,420 * | 1/1999 | Borza .................................. 382/127 |
| 5,920,384 * | 7/1999 | Borza .................................. 356/71 |

\* cited by examiner

US 6,188,781 B1

METHOD AND APPARATUS FOR ILLUMINATING A FINGERPRINT THROUGH SIDE ILLUMINATION OF A PLATEN

FIELD OF THE INVENTION

This invention relates generally to a fingerprint scanning system, and more particularly to a method and apparatus for illuminating a fingerprint in an automatic fingerprint imaging device.

BACKGROUND OF THE INVENTION

Automatic fingerprint scanners are commonly used to obtain an analog or digital image for security, access, verification, or record-keeping applications. In most conventional scanners, a two-dimensional (2D) image of the fingerprint is captured by an imaging device having a matrix of picture elements or pixels arranged as multiple rows and columns. A 2D light-sensitive electronic sensor, such as a charge-coupled device (CCD), is typically used to capture a fingerprint image. However, the cost, size, and uniformity requirements of traditional lighting sources may make them expensive or impractical for use in some constrained physical environments, such as keyboards, laptop computers, and pointing devices such as a mouse or trackball.

A traditional method of illuminating a fingerprint in an imaging device is to use a light source positioned below a transparent platen of the device. However, this method typically increases the cost and size of the imaging device and may not provide uniform illumination of the fingerprint or background of the fingerprint image.

Therefore, there is a need for a small and inexpensive way of illuminating a fingerprint in a constrained physical environment.

SUMMARY OF THE INVENTION

The present invention provides a method and apparatus for illuminating a fingerprint. A finger is placed on a transparent platen which has a microprism array on one surface. A light source directs light through a horizontal plane of the platen to illuminate the finger. Light directed through the platen is substantially parallel to an axis of the microprism array and is largely contained within the body of the platen. The skin in contact with the platen is illuminated by the light, and the light is imaged by an imaging device.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION OF A PREFERRED EMBODIMENT OF THE PRESENT INVENTION

In the following description of a preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

In the following description, for purposes of explanation, numerous specific details are set forth in order to provide a thorough understanding of the present invention. It will be evident, however, to one skilled in the art that the present invention may be practiced without these specific details.

The present invention offers several advantages over existing systems. An imaging device having a light source positioned to direct light through a horizontal plane of a transparent platen substantially parallel to an axis of a microprism array is typically smaller and less expensive than a traditional imaging device with the light source positioned below the platen, making the present invention typically smaller and cheaper to manufacture. The effect of total internal reflection, achieved by directing the light through the platen substantially parallel to an axis of the microprism array, results in an improved quality of a fingerprint image. With the present invention, the background of the image is dark and the fingerprint ridges are illuminated. This yields a higher signal to noise ratio for the image, and the light output uniformity of the light sources becomes less critical.

Figure 1:
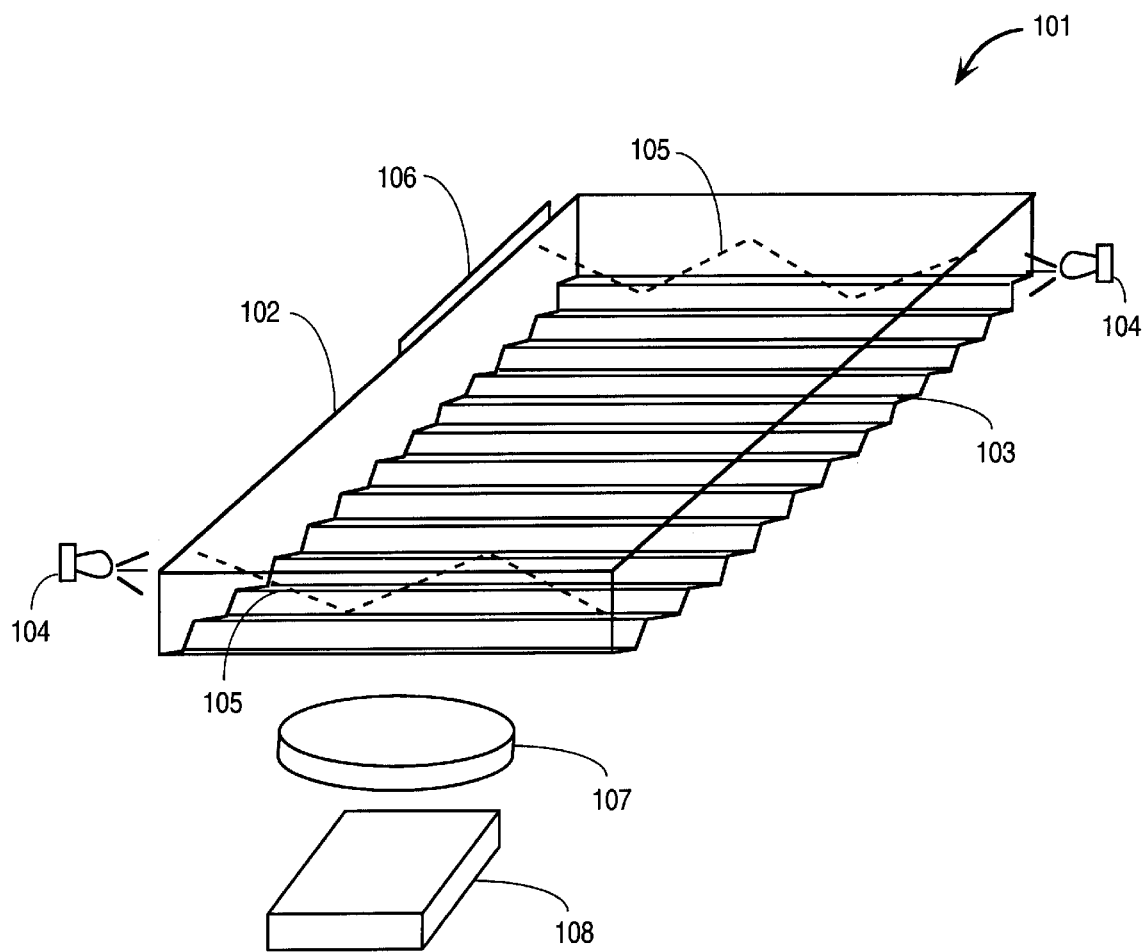
FIG. 1 is a perspective view of a fingerprint scanning system compatible with the present invention.

FIG. 1 shows a perspective view of an embodiment 101 of the present invention. A transparent platen 102 has a microprism array 103 on one surface of the platen. The microprism array may be an integral part of the platen, but it will be recognized by one of ordinary skill in the art that the microprism array may be a separate part of the platen without loss of generality. One or more light sources 104 are positioned to direct light through a horizontal plane of the platen. For the purpose of illustration only, the light sources 104 are positioned on opposite sides of the platen 102, but it will be recognized by one of ordinary skill in the art that other positions of the one or more light sources 104 may be used with the present invention without loss of generality, such as positioning the one or more light sources 104 on one side of the platen 102. Dotted lines 105 demonstrate the directions of the light which are substantially parallel to an axis of the microprism array 103. An optional reflective surface 106 may be positioned adjacent to the platen 102 opposite the light sources 104 for efficiency and uniformity of the light. The reflective surface 106 may be a mirror, but it will be recognized by one of ordinary skill in the art that other reflective surfaces may be used with the present invention without loss of generality, such as a foil, a metal layer, or glass with a different index of refraction. An optional focusing device 107 may be used to focus an image of a fingerprint onto an imaging device 108. The one or more light sources 104 may be light emitting diodes (LEDs), but it will be recognized by one of ordinary skill in the art that other light sources may be used with the present invention without loss of generality, such as incandescent light or ambient light. The majority of the light energy is contained within the body of the platen 102, due to total internal reflection at the top and bottom surfaces of the platen 102. Light can escape from the platen 102 and illuminate the finger only in areas where skin is in contact with the platen 102. A component of light from the one or more light sources 104 is typically scattered in the direction of the imaging device 108.

Figure 2:
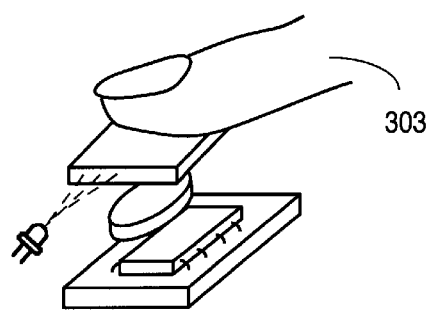
FIG. 2 is a perspective view of a vertical fingerprint scanning system compatible with the present invention.
Figure 3:
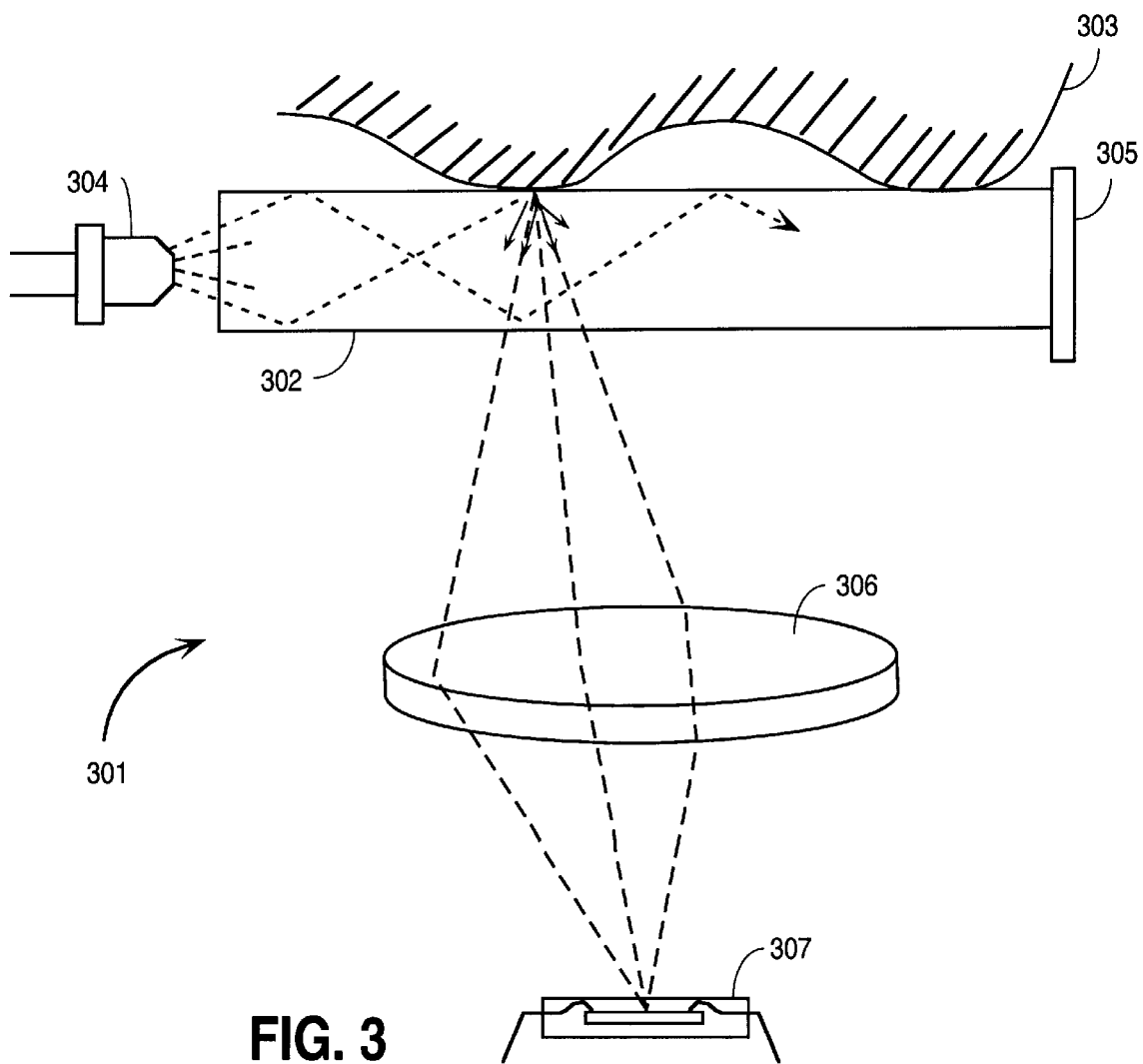
FIG. 3 is a horizontal view of a vertical fingerprint scanning system compatible with the present invention.

FIG. 2 and FIG. 3 show a perspective and horizontal view of a vertical embodiment 301 of the present invention. A finger 303 is positioned on a transparent platen 302. A light source 304 directs light through the platen 302 to illuminate the finger 303. An optional reflective surface 305 may be positioned adjacent to the platen 302. An optional focusing device 306 may be used to focus an image of a fingerprint onto an imaging device 307. The focusing device 306 may preferably be a lens, but it will be recognized by one of ordinary skill in the art that other focusing devices, such as a SELFOC lens or curved mirror, may be used with the present invention without loss of generality. The imaging device 307 may be a charge-coupled device (CCD), but it will be recognized by one of ordinary skill in the art that other imaging devices, such as a complementary metal-oxide semiconductor (CMOS) sensor or a contact image sensor (CIS), may be used with the present invention without loss of generality.

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. An apparatus for illuminating a fingerprint comprising:
    a transparent platen having sensing surface, a bottom surface, and sides, one of the surfaces including a microprism array; and
    a light source positioned to direct light through a horizontal plane of the platen substantially parallel to an axis of the microprism array, the fingerprint illuminated using multiple total-internal-reflection (TIR) bounces of light rays down the plane of the platen, between the microprism array and the other surface to reach points of skin contact.

2. The apparatus of claim 1 further comprising a reflective surface on the side of the platen opposite to the light source.

3. The apparatus of claim 1 further comprising a reflective surface positioned adjacent to the platen opposite to the light source.

4. The apparatus of claim 1 wherein the platen comprises a plastic platen.

5. The apparatus of claim 1 wherein the platen comprises a glass platen.

6. The apparatus of claim 1 wherein the light source comprises a light-emitting diode (LED).

7. The apparatus of claim 1 further comprising an imaging device positioned to capture an image of the fingerprint.

8. The apparatus of claim 7 further comprising a focusing device positioned to focus the image of the fingerprint onto the imaging device.

9. The apparatus of claim 8 wherein the focusing device comprises one of the following: a lens, a curved mirror, and a SELFOC lens.

10. The apparatus of claim 1, wherein the microprism array is located on the bottom surface.

11. The apparatus of claim 1, wherein the microprism array is located on the sensing surface.

12. The apparatus of claim 7 wherein the imaging device comprises a charge-coupled device (CCD).

13. The apparatus of claim 7 wherein the imaging device comprises a complementary metal-oxide semiconductor (CMOS) sensor.

14. The apparatus of claim 7 wherein the imaging device comprises a contact image sensor (CIS).

15. A method for illuminating a fingerprint comprising:
    receiving a finger on a transparent platen having sensing surface, a bottom surface, and sides, one of the sensing surfaces including a microprism array; and
    illuminating the fingerprint with a light source positioned to direct light through a horizontal plane of the platen substantially parallel to an axis of the microprism, the fingerprint illuminated using multiple total-internal-reflection (TIR) bounces of light rays down the plane of the platen, between a first surface and the microprism array to reach points of skin contact.

16. The method of claim 15 further comprising capturing an image of the fingerprint through the platen with an imaging device.

17. The method of claim 16 further comprising focusing the image of the fingerprint onto the imaging device.

18. The method of claim 15, further wherein the platen comprises a sensing surface, a bottom surface, and two sides, the method further comprising:
    reflecting the light off a reflective surface located on a side of the platen opposite the light source.

19. The method of claim 18, further wherein the reflective surface is a mirrored surface.

20. The method of claim 18, wherein the microprism is a part of the bottom surface.

21. The method of claim 18, wherein the microprism is a part of the sensing surface.

* * * * *